DISK REFERENCE PHASE-PULSE DETECTOR

Filed April 15, 1959 4 Sheets-Sheet 1

INVENTOR.
GEORGE H. BARRY
BY Moody and Goldman
ATTORNEYS

INVENTOR.
GEORGE H. BARRY
BY Moody and Goldman
ATTORNEYS

Aug. 14, 1962 G. H. BARRY 3,049,673

DISK REFERENCE PHASE-PULSE DETECTOR

Filed April 15, 1959 4 Sheets-Sheet 3

INVENTOR.
GEORGE H. BARRY
BY Moody and Goldman
ATTORNEYS

Aug. 14, 1962 G. H. BARRY 3,049,673

DISK REFERENCE PHASE-PULSE DETECTOR

Filed April 15, 1959 4 Sheets-Sheet 4

INVENTOR.
GEORGE H. BARRY
BY Moody and Goldman
ATTORNEYS 3,049,673

DISK REFERENCE PHASE-PULSE DETECTOR

George H. Barry, North Hollywood, Calif., assignor to Collins Radio Company, Cedar Rapids, Iowa, a corporation of Iowa Filed Apr. 15, 1959, Ser. No. 806,691
8 Claims. (Cl. 329—104)

This invention relates to demodulators of phase-pulsed signals. Phase-pulsed signals can be defined as a carrier frequency that is phase-shifted periodically, wherein digital information is encoded in the amount of the discrete phase shifts. By proper choice of frequency and phase-shift synchronization, a large number of independently modulated carrier frequencies can be closely spaced without crosstalk. Furthermore, with proper coding, any single carrier frequency can carry plural independent channels. The constant phase portions of the signal between phase-shifts are called "phase-pulses."

Phase-pulsed signals can be generated by many different means, such as given in the following United States applications and patents (all assigned to the same assignee as the present application): Patent No. 2,676,245 titled "Polar Communication System" by Melvin Doelz issued April 20, 1954; Patent No. 2,833,917 titled "Locking Oscillator Phase-Pulse Generator" to Dean F. Babcock issued May 6, 1958; patent application Serial No. 716,206 titled "Data Phase Coding System" by Frank Delaney filed February 19, 1958; patent application Serial No. 626,493, titled "Phase-Pulse Generator" by George Barry filed December 5, 1956; patent application Serial No. 633,143 titled "Matrix Controlled Phase-Pulse Generator" by Dean F. Babcock filed January 8, 1957; and patent application Serial No. 502,045 titled "High Speed Transmission of Messages" by Melvin L. Doelz and Dean F. Babcock filed April 18, 1955.

A prior phase-pulse demodulator is taught in the above-mentioned patent application titled "High Speed Transmission of Messages." Briefly, such a demodulator has two keyed filters which accept alternately received phase-pulses. The keyed filter component is described in Patent No. 2,825,808 to Melvin L. Doelz and Earl T. Heald, issued March 4, 1958, titled "Keyed Filter" and assigned to the same assignee as the present application. Each phase-pulse is integrated in a keyed filter, which also stores the phase of the integrated pulse for the next-following pulse period by allowing the filter to ring for that period. The outputs of the keyed filters are simultaneously applied to two phase detectors, which may be conventional, but 90° phase-shifts are provided at the inputs of one of the phase detectors. The 90° phase shift allows decoding into respective channels for two independent channels simultaneously modulated on a given received tone. The output polarities of both phase detectors are momentarily sampled at the end of each phase-pulse period to obtain maximum signal-to-noise ratio and to avoid inter-channel cross-talk. The synchronously sampled polarities contain the demodulated information of the received phase pulses. Sampling means for the prior demodulator is taught in patent application Serial No. 674,403, titled "Detector Sampling Means" by George Barry filed July 26, 1957 and assigned to the same assignee as the present application.

Another type of phase-pulse demodulator using an entirely different principle than the previously discussed demodulator is taught in patent application Serial No. 769,452 filed October 24, 1958 titled "Digital Phase-Pulse Demodulator" invented by Frank Secretan and assigned to the same assignee as the present application. The Secretan demodulator obtains digital phase-detection from transient phenomena of bistable circuitry.

It is an object of this invention to provide a phase-pulse demodulator that uses a uniquely different principle of operation from any prior demodulators of a phase-pulsed tone carrying one or plural simultaneous channels of information.

It is another object of this invention to provide a phase-pulse demodulator that does not use alternating current integration.

It is still another object of this invention to provide a phase-pulse demodulator that can use direct-current integrators without requiring phase synchronization of any heterodyning frequency with a carrier frequency.

It is a further object of this invention to provide a phase-pulse demodulator that integrates at direct-current levels, yet permits a heterodyning frequency error limited only by the data rate of the detected tone.

Still further objects of the invention are to provide a phase-pulse demodulator:

(*a*) That is not significantly temperature sensitive.

(*b*) That can be manufactured in small sizes.

(*c*) That needs little, if any adjustment after manufacture.

(*d*) That can eliminate cross-talk between plural channels of a given tone.

The invention includes a pair of heterodyning circuits, which may be either phase-detectors or balanced modulators. Basically, balanced modulators can be operated as phase detectors. The phase-pulsed tone to be demodulated is provided at one input to each of the heterodyning circuits. Another input to each heterodyning circuit is supplied by a local oscillator tuned to the frequency of the incoming tone that is to be demodulated. The local oscillator inputs to the heterodyning circuit are phase displaced by 90°. A frequency error is permitted for the local oscillator as long as it is within a tolerance determined by the data rate of the tone.

A pair of direct-current integrating circuits of the low-pass filter type have inputs respectively connected to the outputs of the heterodyning circuits. A pair of "and" gates each have an input connected to a respective one of said integrating circuits. A quenching and sampling timing source is connected in common to another input of each of the "and" gates. The pulses of the timing source are timed with the modulation phase shifts of the received tone.

A unique saturable-disk phase memory device is used. It includes a pair of coils with axes spaced 90° from each other and a magnetically saturable disk positioned in the composite flux field of the coils, which are respectively connected to the outputs of the "and" gates. A torque transducer is coupled to the disk to transduce the positive and negative torque transients of the disk into electrical pulses which contain the data in their polarities.

Further objects, features and advantages of this invention will become apparent to one skilled in the art upon further study of the specification and accompanying drawings in which:

FIGURE 1 illustrates an ensemble of modulated tones which may be applied to the invention;

FIGURES 2 (A) through (K) show waveforms used in explaining the operation of the invention;

FIGURE 3 is an embodiment of the invention for detecting a tone modulated with a single binary channel;

FIGURES 4 (A) and (B) illustrate heterodyned signal phase relationships;

Figure 1:
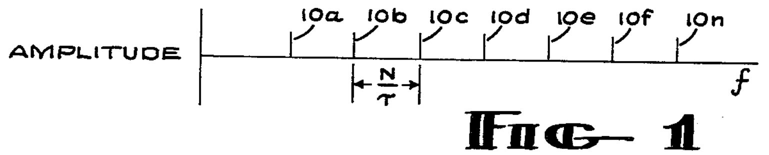
Figure 2:
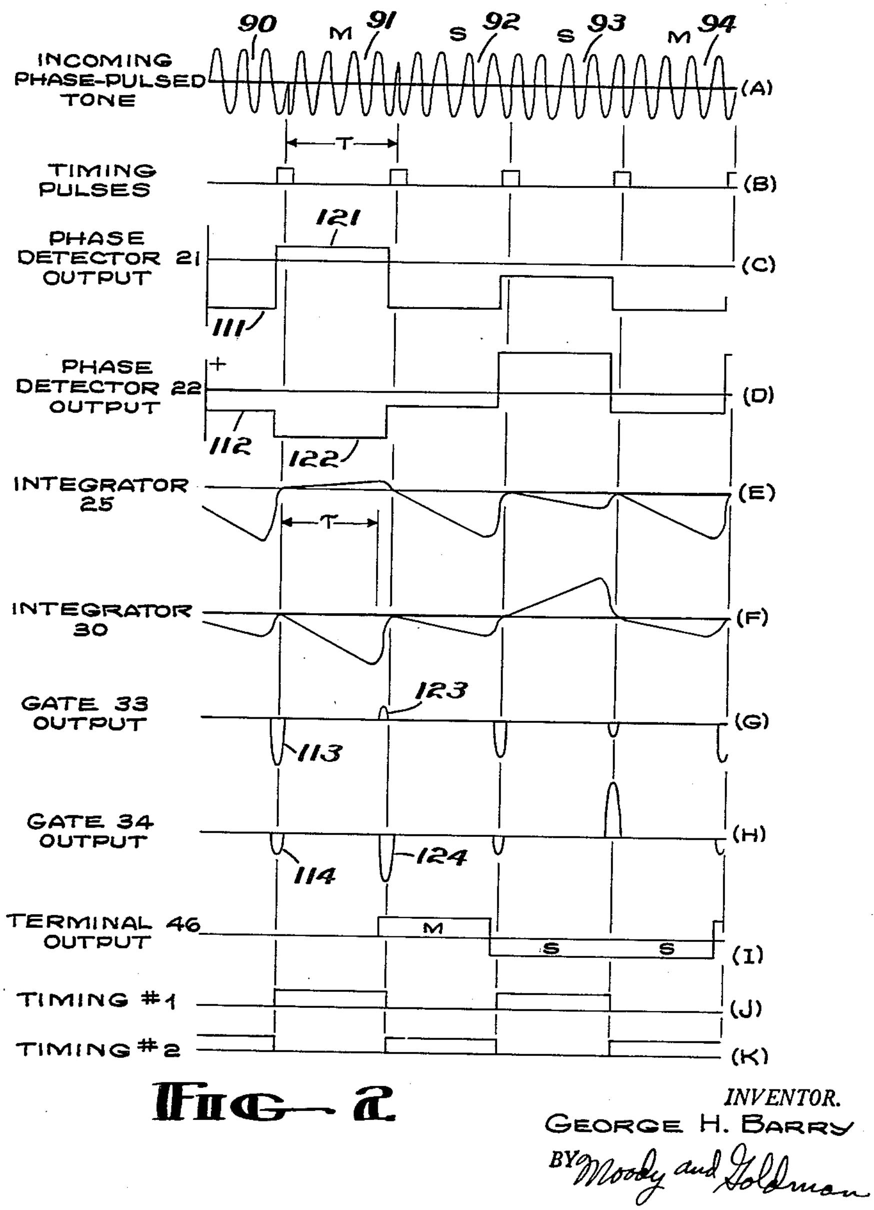

FIGURE 1 illustrates an ensemble of carrier frequencies (tones) 10$a$ through 10$n$, which may be received by the invention. Each of the tones is independently modulated with binary information in a phase-pulsed manner. The tones are each phase-shifted simultaneously at periodic intervals T as shown in FIGURE 2. The carrier tones are frequency spaced from each other by $$\frac{N}{\tau}$$

cycles-per-second, where N is any integer other than zero, and $\tau$ is the detector signal integration period.

Any given embodiment of the invention selects and demodulates one tone of the ensemble, such as tone 10$f$.

Each tone in an ensemble may be modulated in a phase-pulsed manner with one or more information channels, simultaneously. FIGURE 2 (A) illustrates a single tone that is phase-pulsed in a manner used by this invention. That is, the tone maintains a substantially fixed phase for a period T and then is quickly phase-shifted in an amount determined by binary information to another phase, which is maintained for the next period T. Each period T is defined herein as a phase-pulse.

Figure 5:
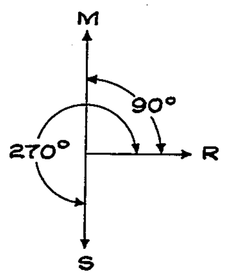
FIGURE 5 illustrates the phase modulation relationships between adjacent pulses of a modulated tone carrying a single channel of information.

FIGURE 5 illustrates ideal phase coding for modulating a single channel on a given tone. In this case, the phase-shift between any two phase-pulses of the tone is either 90° or 270°, according to whether mark (M) or space (S) modulation is desired. Thus in FIGURE 5, vector R represents a phase of the first of any two consecutive phase-pulses, and the second pulse has the phase of either vector M or S according to whether it is to represent a mark or a space.

Figure 3:
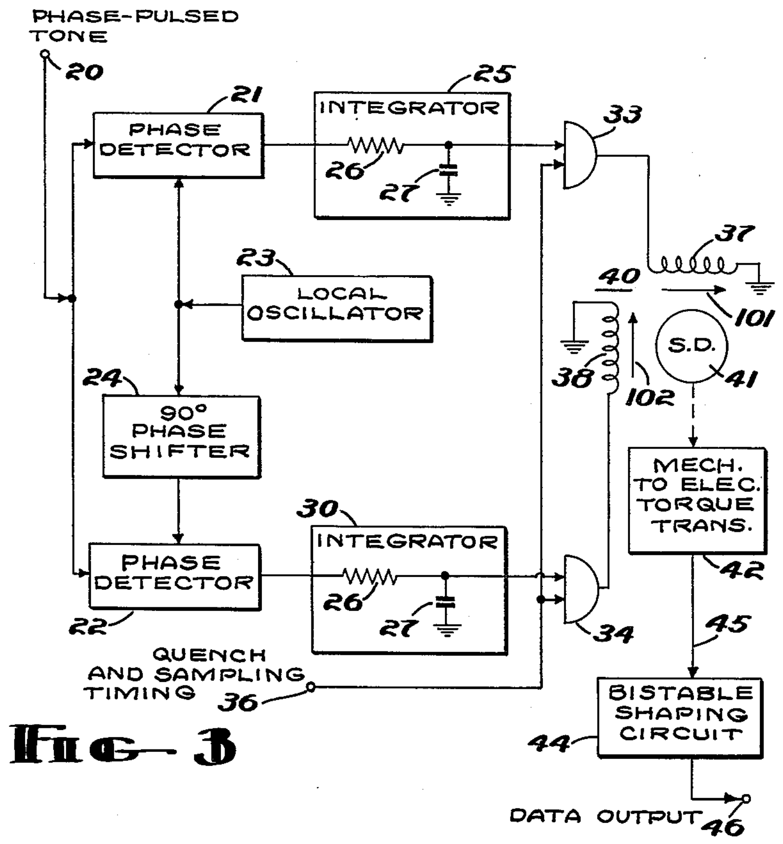

FIGURE 3 shows an embodiment of the invention for detecting a tone modulated with the code shown in FIGURE 5. It includes input terminal 20 which may receive the entire tone ensemble. However, only one of the tones having a frequency equal to that of a local oscillator 23 is demodulated by the detector in FIGURE 3. Accordingly, to detect all of the tones in an ensemble it is necessary to provide a separate circuit of the type shown in FIGURE 3 for each tone in the ensemble and to have the respective oscillator in each circuit tuned to the respective tone frequency that its circuit is to detect.

A pair of phase detectors 21 and 22 each have an input connected to terminal 20.

Local oscillator 23 does not have to be synchronized with the incoming tone to be detected, but oscillator 23 need only have a frequency stability within a tolerance determined by the data rate of the tone. Thus, where a single channel is providved on the modulated tone at a 60 word-per-minute rate with 7 bit-per-character pulse-code-modulation (including start and stop bits), oscillator 23 need have a frequency stability only within about ±6 cycles-per-second of the carrier frequency of the tone to be detected. However, for simplicity in the explanation of the operation of the circuit, it will be presumed that the frequency of local oscillator 23 is equal to that of the carrier tone provided at terminal 20 for demodulation.

An output of local oscillator 23 is provided to the other inputs of the phase detectors with a 90° phase difference. Hence, local oscillator 23 is directly connected to phase detector 21 but is phase shifted by 90° by a circuit 24 before being provided to phase detector 22. The two phase detectors 21 and 22 are presumed identical, and therefore each has precisely the same conversion gain or attenuation, as the case may be. FIGURES 2 (C) and (D) illustrate examples of the phase detector outputs.

A pair of direct-current integrating circuits 25 and 30 have inputs respectively connected to the outputs of phase detectors 21 and 22. Each integrator includes a resistor 26 and a capacitor 27 connected in a low-pass filter configuration with a long time constant compared to period T. The voltage across capacitor 27 provides the output of each integrator.

A pair of coincidence or "and" gates 33 and 34 have inputs respectively connected to the outputs of integrators 25 and 30. Another input of each "and" gate is connected to a terminal 36, which receives timing-pulses of the type illustrated in FIGURE 2 (B), which are used for simultaneously discharging and sampling the integrator circuits 25 and 30. The timing pulses are synchronized with the phase-shift transients of the received tone shown in FIGURE 2 (A).

A disk type of transducer circuit 40 includes a pair of coils 37 and 38 which are serially connected to the outputs of gates 33 and 34. Each coil has an equal number of turns, and their axes are positioned at 90° with respect to each other.

Figure 6:
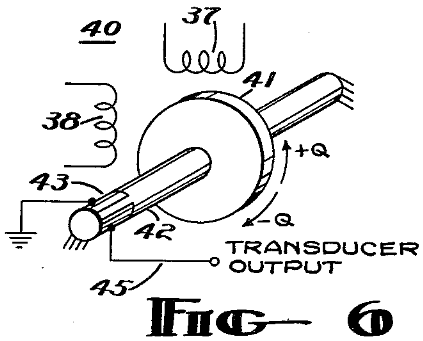
FIGURE 6 shows a saturable disk component in the invention.

Transducer circuit 40 also includes a disk 41 of saturable magnetic material, which may be a ferrite having a square type of hysteresis loop. The squareness of the hysteresis loop is not basically essential to the invention, but it improves circuit efficiency. Saturable disk 41 is supported in fixed position and is thereby restrained from rotating except by stressing a supporting crystal transducer 42 coupled to disk 41. However, transducer 42 may have many variations other than piezoelectric such as magnetostrictive, electrostrictive, photoelectric, magnetic, capacitive, etc. that are capable of operating from the torques on disk 41. FIGURE 6 illustrates transducer 42 using a piezoelectric shaft operated in a torsional mode. One end of the crystal shaft 42 is cemented to the center of disk 41 and the other end is fixed to a frame (shown schematically). A pair of capacitor plates 43 is provided about crystal 43 as part of the transducer. A voltage is induced between them having a polarity dependent upon the direction of the torque coupled from the disk. Torsional mode crystals are well known and therefore a detailed explanation of their operation is not provided herein. Accordingly, transducer capacitor 42 is connected between ground and an output lead 45 which provides the output voltage. Because the torque will occur in spurts, the transducer output voltage will be pulsed with either positive or negative polarity, according to the direction of the spurts of torque. The output polarities represent the demodulated binary data.

A bistable shaping circuit 44 is connected to the output of the transducer and is triggered by each pulse to a voltage level corresponding to the polarity of the pulse. Accordingly, the output of shaping circuit 44 provided to a terminal 46 represents the data as shown in FIGURE 2 (I).

Figure 4:
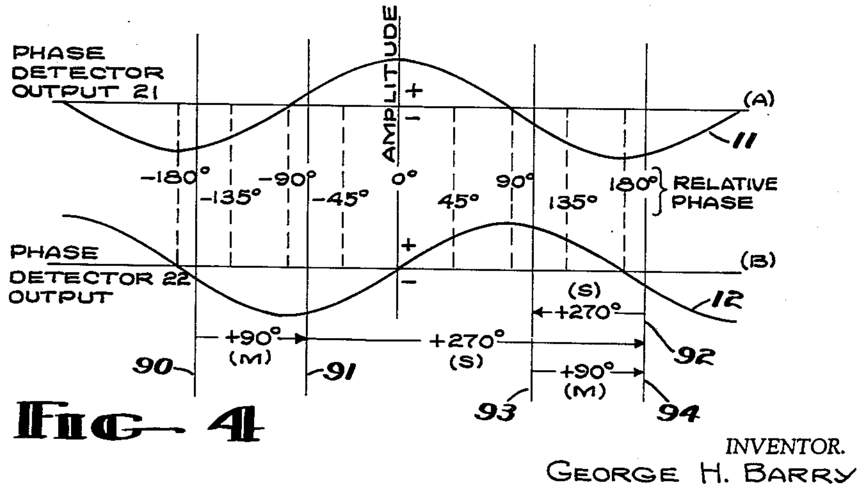

FIGURES 4 (A) and (B) illustrate the respective amplitude relationships between the outputs of phase detectors 21 and 22 at every arbitrary phase relationship between the signal carrier and the frequency oscillator 23. These amplitude relationships vary in a sinusoidal manner with continuous (not digital) phase variation between the incoming tone and the local oscillator; however, the two phase-detector outputs have a constant 90° phase-shift between the inputs from local oscillator 23.

Nevertheless, FIGURES 4 (A) and (B) can be used to analyze digital phase-shifts between a phase-pulsed incoming tone and a steady local-oscillator frequency. This can be done by drawing a vertical line through FIGURES 4 (A) and (B) at the angle which represents the phase between oscillator 23 and the incoming tone during a given phase-pulse. The next phase-pulse is represented by another vertical line spaced from the first vertical line by the amount of phase shift between the phase-pulses. This method can show the change in relative output amplitudes of the phase detectors on a pulse-by-pulse basis.

Integrators 25 and 30 provide substantially linear integration over each period $\tau$, because of long time constants, as shown in FIGURES 2 (E) and (F). Therefore, the ratio between the outputs of the two integrators at the end of each integration period $\tau$ is the same as the amplitude ratio of the phase detector outputs found along a vertical line through FIGURES 4 (A) and (B) representing a given phase-pulse. However, the integration improves the signal-to-noise ratio of the system; since only the signal can integrate linearly, while noise and interfering frequencies, such as other tones not being detected, are filtered out or do not build up as fast as the signal, due to lack of correlation in the integrator.

FIGURES 2 (E) and (G) illustrate integration and quenching cycles for integrator 25, and FIGURES 2 (F) and (H) for integrator 30. Thus integration occurs over most of period T but for a short interval (which is $T-\tau$) when gates 33 and 34 are opened to provide a very short time constant discharge through respective coils 37 and 38. That is, the time-constant associated with a capacitor 27, an "and" gate, and a connected coil is short compared to period ($T-\tau$). Hence, at the end of each timing pulse, virtually no charge is left in capacitor 27; and it is sensitive only to the polarity induced by the next phase-pulse.

Any integration may have either positive or negative polarity as a function of the binary data. The discharging currents through coils 37 and 38 have varying amplitudes and polarities as shown in FIGURES 2 (G) and (H). The amplitudes and polarities of the current pulses through the coils are proportional to the average amplitudes and corresponding polarities at the outputs of the phase detectors, as shown in FIGURES 2 (C) and (D).

Figure 7:
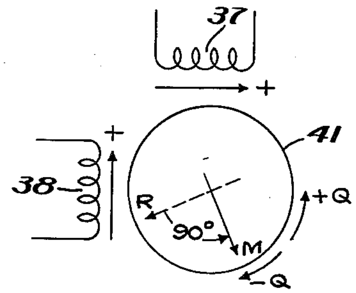
FIGURE 7 illustrates torque-flux directional relationships for a disk component detecting a single channel.
Figure 8:
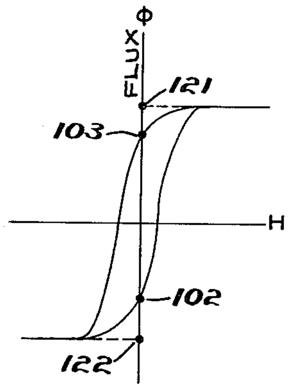
FIGURE 8 shows a hysteresis loop of material comprising a disk.

For example, assume that the first phase-pulse 90 shown in FIGURE 2 (A) is provided at input 20 in FIGURE 3, and that it has any arbitrary phase relative to the oscillator output, such as a phase of −160° represented by a vertical line 90 in FIGURE 4. Thus, the amplitudes from detectors 21 and 22 will be −0.946 and 0.326 respectively, assuming a maximum amplitude of ±1. After integration, the following timing pulse discharges the integrated currents with proportional amplitude and polarity through the coils. Thus, pulses 113 and 114 in FIGURES 2 (G) and (H) maintain the same ratio as the average phase detector output levels 111 and 112 in FIGURES 2 (C) and (D). Hence, coil 37 receives a large current discharge in a negative direction (the positive direction is designated by arrow 101); and coil 38 receives a smaller current discharge in a negative direction. Thus, the flux from coils 37 and 38 will combine vectorially in the space occupied by disk 41 to provide a resultant flux in the direction of dashed arrow "R" in FIGURE 7 (−160° relative to the positive axis of coil 37). At the peak of the current discharges, the resultant flux density through disk 41 exceeds its saturation level shown at point 122 in FIGURE 8. After the decay of the flux following the current pulses, a residual magnetism having the intensity indicated at point 102 in FIGURE 8 is retained in the direction of vector R.

The next phase-pulse 91 in FIGURE 2 (A) is a mark (M) which is displaced by 90° leading from prior phase-pulse 90. Thus in FIGURE 4, a vertical line 91, displaced 90° leading from vertical line 90, represents the mark phase-pulse to provide phase-detector output levels 121 and 122 in FIGURES 4 (C) and (D). At the next quenching pulse, pulsed current discharges 123 and 124 in FIGURES 2 (G) and (H) are provided respectively through coils 37 and 38 to provide a resultant saturating flux through disk 41 in direction M in FIGURE 7. The direction of vector (M) in FIGURE 7 is 90° from the prior residual magnetism in direction "R," which was erased by the last saturation. However, as the flux builds up during the pulsed current discharge through the coils before reaching saturation level, disk 41 tends to twist in a direction Q by a motor type of operation, wherein the residual magnetism in direction R attempts to align with the increasing field flux in direction (M). Hence, a torque is created in rotational direction (Q) in FIGURE 7 which causes a positive-polarity output voltage from the piezoelectric transducer.

The torque is exerted only during the initial portions of flux build-up prior to the core saturation in the new direction (M), since after saturation the core loses the prior residual magnetism in direction "R." Hence new direction "M" is thereafter stored by residual magnetism and represents the last completed phase-pulse to provide the reference direction for the flux created by the next phase-pulse 92.

A phase pulse that represents a space induces a torque in the opposite rotational direction (−Q) of disk 41 to cause an opposite polarity readout from the piezoelectric transducer.

In FIGURE 4, other vertical lines 92, 93, etc. represent subsequent phase-pulses 92, 93, etc. of FIGURE 2 (A), with each vertical line being spaced from its prior one by the phase-shift introducing each phase-pulse.

Figure 9:
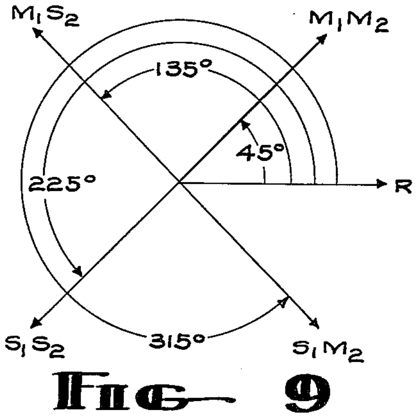
FIGURE 9 illustrates phase relationships between adjacent pulses of a tone modulated simultaneously with two channels of coded data.
Figure 10:
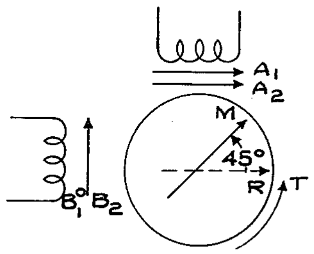
FIGURE 10 illustrates the torque-flux directional relationships found in a disk used with a tone carrying two channels of data.
Figure 11:
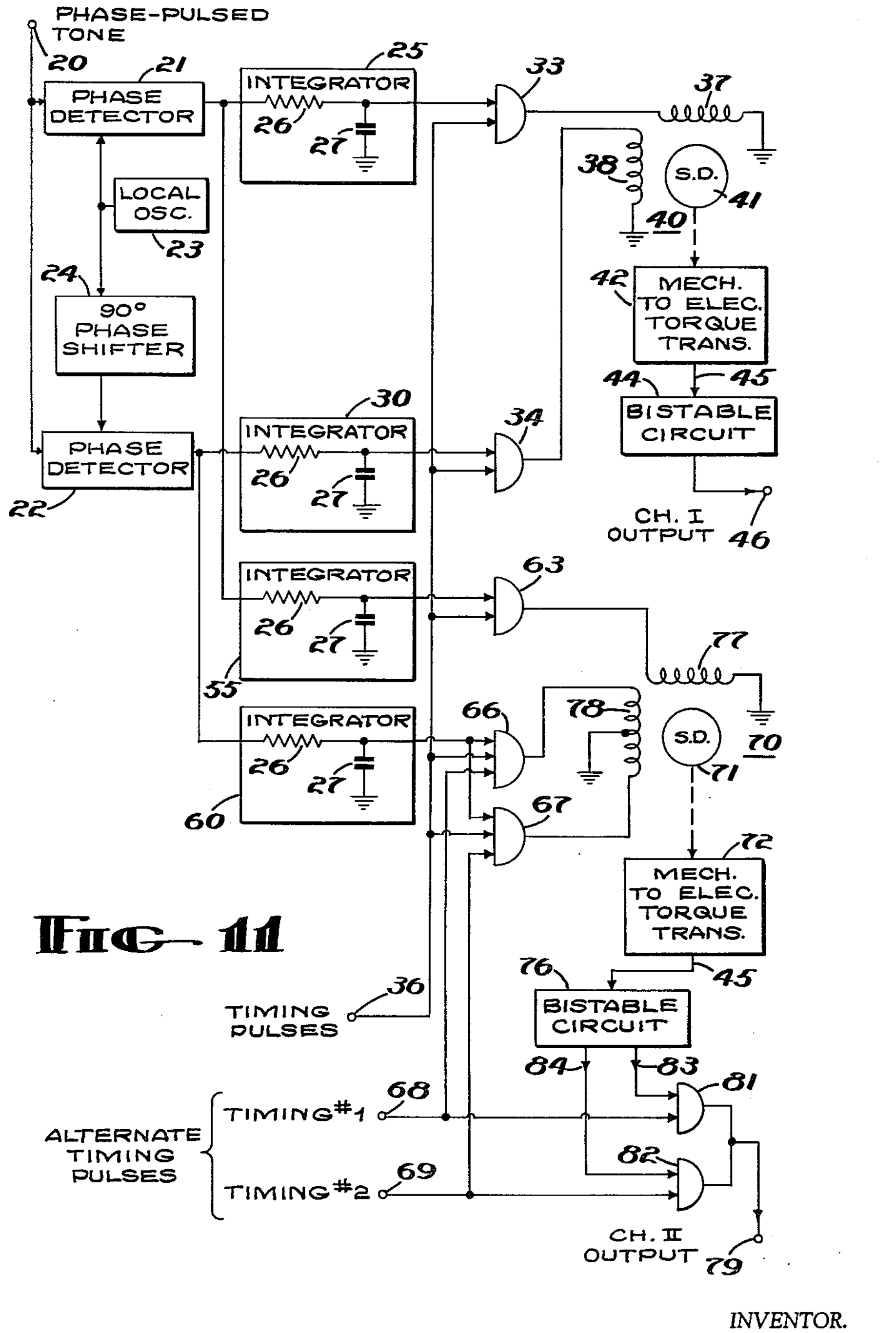
FIGURE 11 shows an extended embodiment of the invention capable of detecting two simultaneous channels modulated on a tone.

The circuit of FIGURE 11 is capable of demodulating a tone simultaneously carrying two independent channels of information. The circuit involves an extension of the circuit of FIGURE 3 which demodulates only a single channel. A two-channel tone may be represented also by the wave in FIGURE 2 (A), except that one of four possible phase-shifts occurs at periods T, rather than one of two phase-shifts in the single channel case. FIGURE 9 illustrates the four possible phase-shifts between two phase-pulses. Therein, vector "R" represents the phase of a prior phase-pulse, and the next phase-pulse is represented by any one of the other four vectors displaced by multiples of 45°. Hence any of these phase-shifts represents simultaneously one information-bit of the two independent channels by virtue of the coding $M_1M_2$, $S_1M_2$, $S_1S_2$ and $M_1S_2$.

The circuit of FIGURE 11 can demodulate any single tone of the ensemble of tones shown in FIGURE 1 modulated with two channels.

Items 20–46 in FIGURE 11 may be constructed in the same manner as like-numbered items in FIGURE 3, and the data output at terminal 46 in FIGURE 11 provides one of the demodulated channels.

Additional circuitry however is necessary for demodulating the other channel. Accordingly, another pair of integrators 55 and 60 are respectively connected to the outputs of phase detectors 21 and 22 in FIGURE 11. Integrators 55 and 60 are identical to integrators 25 and 30.

The circuitry connected to the output of integrator 60 deviates from that found in FIGURE 3 in order to accomplish demodulation of the second channel, which requires a 90° change in position in the direction of the reference vector saturably stored in disk 41. To accomplish this 90° directional change, an alternate reversal is provided in the flux direction in one of the coils of the saturable disk. This is done in FIGURE 11 with a transducer 70 which is similar to transducer 40, except that coil 78 of transducer 70 is center-tapped. Coil 77 is connected to an "and" gate 63 in precisely the same manner that coil 37 of transducer 40 is connected to gate 33. However, coil 78 is center-tapped into two parts, each having the same number of turns as coil 77 for inducing the same flux magnitude in saturable disk 71 as coil 77.

Theoretically, when there are two equal magnitude component vectors spaced by 90°, their resultant can be rotated 90° by reversing the direction of one of the component vectors by 180°. This is the principle applicable to transducer 70.

Each of a pair of "and" gates 66 and 67 has an input connected to the output of integrator 60. However, gates 66 and 67 have other inputs respectively connected to terminals 68 and 69 which receive alternately-timed pulses of the type shown in FIGURE 2 (J) and (K), respectively, to alternately enable gates 66 and 67 with respect to the timing pulses of terminal 36. Consequently, this alternately reverses the direction of the component flux of coil 78, which in turn causes an alternate 90° reversal in the resultant of both coils through saturable disk 71.

Nevertheless, this type of 90° direction displacement involves an alternate 180° error, which manifests itself as a polarity error in alternate bits of data from the output of a bistable circuit 76 connected to the torque transducer 72. The polarity error is compensated by another pair of "and" gates 81 and 82 which alternately reverse the output polarity of bistable circuit 76, which may be identical to circuit 44 except that both opposite-polarity outputs 83 and 84 are used. Polarity-correction gates 81 and 82 have inputs respectively connected to outputs 83 and 84. Another input of each gate is respectively connected to terminal 68 and 69 so that the gates are respectively enabled during alternate bits of information. The outputs of gates 81 and 82 are connected in common to output terminal 79 to provide the output data of channel II.

In the construction of the saturable disk and transducer assembly, it is desirable that the disk have a mechanical-resonant frequency that is much higher than the data rate, and that it be critically damped to prevent torsional vibration following current pulses.

Although this invention has been described with respect to particular embodiments thereof, it is not to be so limited as changes and modifications may be made therein which are within the full intended scope of the invention as defined by the appended claims.

I claim:

1. A circuit for storing the phase of an input signal, comprising means for separating said input signal into quadrature phased components, means for detecting the amplitudes of said components to produce a corresponding pair of output signals, a pair of coils having their axes aligned in space quadrature in a common plane, nonrotatable flexible supporting means having an axis positioned substantially perpendicular to the plane of said coil axes, a body of saturable magnetic material mounted rigidly on nonrotatable support means and positioned in the magnetic field created by energization of said pair of coils, means including periodic gating means for supplying said pair of output signals to said pair of coils, said output signals causing a resultant magnetic flux of saturating magnitude through said body, said body having a remanent magnetic field existing after termination of said output signals, said magnetic field having a direction determined by the phase of the input wave at the time of said output signals.

2. A circuit for determining the direction of a discrete phase change of an input signal, including the circuit of claim 1, and further comprising a mechanical-to-electrical transducer mechanically connected to said body, said transducer providing opposite polarities of output voltage signals corresponding to the opposite directions of force applied to it by said body, the polarity of output voltage at any given time corresponding to the direction of the last phase change of said input wave.

3. A circuit defined in claim 2, in which said transducer is a piezoelectric shaft fixed to said body.

4. A demodulator for a phase-pulsed tone, comprising a pair of phase-detectors, each having a pair of input terminals and an output terminal, one input terminal of each receiving said tone, signal generating means including a local oscillator for providing a pair of output signals separated by 90° and having a frequency approximately equal to said tone, said signal generating output signals being connected respectively to the other input terminals of said phase detectors, a pair of direct-current integrating circuits having input terminals respectively connected to the output terminals of said phase detectors, a pair of "and" gates each having a pair of input terminals, said "and" gates each having an input terminal connected to one of said integrators, a quenching and sampling timing source connected to the other input terminal of each of said "and" gates, a pair of coils connected to output terminals of the respective "and" gates, said coils being positioned substantially in a common plane and in space quadrature with respect to each other, nonrotatable flexible shaft means positioned substantially normal to the plane of said coils, a magnetically saturable disk rigidly affixed to said nonrotatable shaft means and located adjacent to said coils, said disk having a remanent magnetic field having a direction determined by the combined magnetic field of said windings, said nonrotatable shaft means comprising mechanical-to-electrical transducer means for providing an output voltage having a polarity dependent upon a direction of force induced in said disk by the magnetic flux produced by said coils when energized, the output signal of said transducer means being a detected output of said demodulator.

5. A demodulator for a phase-pulsed tone simultaneously carrying plural data channels, comprising a pair of phase detectors, each having a pair of input terminals and an output terminal, each detector having one of said input terminals for receiving said tone, signal generating means including a local oscillator providing a pair of output signals where phases are displaced from each other by 90° and having the frequency of said tone, the other input terminal of each phase detector being connected respectively to the output terminals of said signal generating means, a plurality of pairs of integration circuits each having an input terminal and an output terminal, the input terminals of one of each pair of integration circuits being connected to the output terminal of said first phase detector, the input terminals of the other integration circuit in each pair being connected to the output terminal of the other phase detector, a plurality of "and" gates, each having an input terminal connected to a respective one of said integration circuits, a sampling and quenching timing source connected to another input terminal of each of said "and" gates, a plurality of phase-memory devices, each comprising a pair of coils with their axes positioned in space quadrature and lying substantially in the same plane, nonrotatable flexible support means positioned substantially normal to the plane of said coils, a saturable magnetic disk supported rigidly on said nonrotatable support means and adjacent to said pair of coils, said nonrotatable support means including a torque transducer, the pair of coils of said phase-memory devices being respectively connected to output terminals of the "and" gates to receive sampled output signals from said pair of phase detectors, whereby said transducers provide demodulated output data.

6. A demodulator of a phase-pulsed tone simultaneously modulated with a pair of channels of data, comprising a pair of phase detectors, each having an input terminal for receiving said tone, generating means including a local oscillator for providing a pair of output signals phase displaced by 90° from each other, the frequency of said output signals being approximately the carrier frequency of said tone, other input terminals of said phase detectors being respectively connected to said generating means, first and second pairs of integrators, input terminals of said first pair of integration circuits connected to respective output terminals of said phase detectors, input terminals of said second pair of integrators connected to respective output terminals of said phase detectors, first and second groups of "and" gates; the first group of "and" gates having input terminals connected respectively to output terminals of said first pair of integrators, the second group having input terminals connected to said second pair of integrators; first and second phase-memory devices each comprising a pair of coils lying substantially in a common plane, and being supported in space quadrature relative to each other, a nonrotatable flexible shaft means positioned substantially perpendicularly to the plane of said pair of coils, a saturable magnetic disk rigidly supported on said nonrotatable axis and positioned in the magnetic field created by energization of said coils, a mechanical-to-electrical torque transducer rigidly fixed to said disk, and a bistable circuit connected to said torque transducer; the coils of each pair of coils being connected to respective output terminals of one of said groups of "and" gates, a quenching and sampling timing source, an input terminal of each of said "and" gates connected to said quenching and timing source.

7. A demodulator as defined in claim 6 in which said second group of "and" gates includes a pair of "and" gates connected to one of said integrators, alternate-timing means constructed to produce a pair of output signals which provide pulses synchronized with said timing source, said pair of "and" gates having inputs respectively connected to said alternate-timing means; one coil of one of said phase-memory devices being separated into two parts with said two parts being respectively connected to output terminals of said pair of "and" gates, a plurality of bistable circuits connected respectively to electrical output signals of said torque transducers, a second pair of "and" gates having input terminals respectively connected to the output terminals of the bistable circuit connected to the torque transducer which is affixed to the disk controlled by the separated coil, other input terminals of said second pair of "and" gates being respectively connected to said pair of output terminals of said alternate-timing means, and output terminals of said second pair of "and" gates together providing one channel of detected data.

8. A memory device for storing a received angle signal and reading out a direction of angle change for a next received angle signal, comprising a saturable magnetic body, a flexible shaft supporting said saturable magnetic body, means for nonrotatably supporting said shaft, a plurality of stator windings located at different angular positions about said magnetic body, a source of simultaneous component currents having respective amplitudes representing vector components of a received angle signal in the directions of said stator windings, means for coupling said source to said windings, and transducer means connected to said body to indicate torque flexing of said shaft upon successive currents from said source.

References Cited in the file of this patent

UNITED STATES PATENTS

| | | |
|---|---|---|
| 2,686,282 | Salamonovich | Aug. 10, 1954 |
| 2,698,410 | Madsen et al. | Dec. 28, 1954 |
| 2,771,553 | Metzger et al. | Nov. 20, 1956 |
| 2,828,414 | Rieke | Mar. 25, 1958 |
| 2,833,921 | McCrory | May 6, 1958 |
| 2,847,625 | Popowsky | Aug. 12, 1958 |